United States Patent [19]

Schwarz et al.

[11] Patent Number: 5,356,444
[45] Date of Patent: Oct. 18, 1994

[54] PHTHALOCYANINE REACTIVE DYESTUFF MIXTURE

[75] Inventors: Max Schwarz, Leverkusen; Joachim Wolff, Odenthal; Dietrich Hildebrand, Odenthal; Joachim Grütze, Odenthal; Manfred Hoppe, Kürten-Bechen; Josef-Walter Stawitz, Odenthal; Rolf Schulz, Köln, all of Fed. Rep. of Germany

[73] Assignee: Bayer Aktiengesellschaft, Leverkusen, Fed. Rep. of Germany

[21] Appl. No.: 143,559

[22] Filed: Oct. 26, 1993

[30] Foreign Application Priority Data

Nov. 2, 1992 [DE] Fed. Rep. of Germany ....... 4236937
Feb. 23, 1993 [DE] Fed. Rep. of Germany ....... 4305454

[51] Int. Cl.$^5$ .................. C09B 67/22; C09B 67/24; C09B 62/26; D06P 3/66
[52] U.S. Cl. ................................ 8/638; 8/543; 8/547; 8/661
[58] Field of Search ............. 8/543, 547, 638, 661

[56] References Cited

U.S. PATENT DOCUMENTS

| 3,989,692 | 11/1976 | Jager et al. ............... 8/549 X |
| 4,280,956 | 7/1981 | Schreiner et al. ............. 540/125 |
| 4,338,093 | 7/1982 | Hildebrand et al. ............. 8/549 |
| 4,418,015 | 11/1983 | Schreiner et al. ........... 540/125 X |
| 4,557,731 | 12/1985 | Sasakura et al. ............. 8/531 |
| 4,705,524 | 11/1987 | Hahnke et al. ............... 8/527 |
| 4,711,641 | 12/1987 | Nakamatsu et al. ............. 8/524 |
| 5,047,067 | 9/1991 | Miyazaki et al. ............. 8/549 |
| 5,051,501 | 9/1991 | Schundehutte et al. ......... 540/125 |
| 5,163,971 | 11/1992 | Stawitz et al. ............. 8/549 |
| 5,232,462 | 8/1993 | Tzikas ................... 8/549 |
| 5,270,454 | 12/1993 | Hoppe et al. ............. 534/634 |

FOREIGN PATENT DOCUMENTS

| 0044483 | 1/1982 | European Pat. Off. . |
| 0198198 | 10/1986 | European Pat. Off. . |
| 0224224 | 6/1987 | European Pat. Off. . |
| 0318023 | 5/1989 | European Pat. Off. . |
| 0371332 | 6/1990 | European Pat. Off. . |
| 0545207 | 6/1993 | European Pat. Off. . |
| 3718397 | 12/1988 | Fed. Rep. of Germany . |
| 473878 | 7/1969 | Switzerland . |
| 1348149 | 3/1974 | United Kingdom . |
| 2250297 | 6/1992 | United Kingdom . |

OTHER PUBLICATIONS

JP-A-01 144,467, Sumitomo Abstract (1989).
JP-A-01 1,043,568, Sumitomo Abstract (1989).

*Primary Examiner*—Arthur C. Prescott
*Attorney, Agent, or Firm*—Sprung Horn Kramer & Woods

[57] ABSTRACT

A phthalocyanine reactive dyestuff mixture having an improved dyeing levelness and combination properties comprises at least one phthalocyanine vinylsulphonyl reactive dyestuff 1, at least one phthalocyanine fluorochloropyrimidinyl reactive dyestuff 2 and/or a phthalocyanine monochlorotriazinyl reactive dyestuff 3.

10 Claims, No Drawings

PHTHALOCYANINE REACTIVE DYESTUFF MIXTURE

The invention relates to mixtures of phthalocyanine reactive dyestuffs which, when used for dyeing cellulose fibres or regenerated cellulose fibres, show an improved appearance of the goods compared with the individual components and have improved combination properties with reactive yellow dyestuffs for production of green dyeings.

The appearance of the goods obtained by production of turquoise dyeings and of brilliant green dyeings on fibre materials of native or regenerated cellulose fibre substrates or on mixtures of such fibre materials with synthetic fibre materials of polyester, polyacrylonitrile or polyamide shows a limitation in levelness, which depends greatly on the fibre material and on the illumination conditions, compared with the levelness of a blue, yellow or red dyeing produced in accordance with the prior art and combination dyeings thereof. This limitation in levelness which is typical of phthalocyanine reactive dyestuffs is called tippyness or "skitteriness" in technical terms.

The term tippyness or skitteriness comes originally from the sector of wool dyeing and means the unlevel dyeing, especially tippy dyeing of wool with reactive dyestuffs. Tippy dyeing means that the fibre portions in a group of fibres are dyed differently, especially when dyestuff Combinations are used, the tips of the fibres acquiring a lighter appearance. The result is an uneven, "tippy" appearance of the goods, which does not meet the current demands of a textile material suitable for the market.

In the cellulose fibres sector, a similar appearance of the goods is known when both cotton and regenerated cellulose fibres are dyed with copper phthalocyanine dyestuffs mixed with yellow azo dyestuffs.

This is understood as a fibre unlevelness, which is based on the fact that the cellulose fibres combined in the group of fibres have a different dyestuff uptake, which manifests itself in an uneven appearance of the goods, depending on the angle of observation. The so-called tippyness of phthalocyanine dyeings becomes particularly clear and is intensified when dyeing in green shades, that is to say during combined use of phthalocyanine reactive dyestuffs with pyridone and pyrazolone azo reactive dyestuffs. A number of processes have been described for overcoming tippy dyeing of phthalocyanine reactive dyestuffs, in particular in order to improve the uniformity of the dyeing of individual fibres by the phthalocyanine reactive dyestuff by addition of auxiliaries to the dyebath or by formation of the lithium salts of the phthalocyanine reactive dyestuffs in the dyebath. However, this method has the disadvantage that the waste water from the dyeing is additionally enriched with fibre swelling agents or dyestuff solvents, ecological acceptance of which is limited and removal of which from the waste waters is associated with high costs.

According to T. A. Konkova and L. I. Belenkij Tekstilnaja Prom. 27, 4, 66–68 (1967), there are severe objections to binary mixtures of different reactivity and substantivity of the dyestuffs in respect of unlevelness and uncertainty of the colour shade.

The invention furthermore relates to a padding process using a mixture of phthalocyanine reactive turquoise blue dyestuffs in combination with a mixture of yellow reactive dyestuffs for dyeing cellulose fibres or regenerated cellulose fibres, which has an improved appearance of the goods compared with the use of the individual components.

When phthalocyanine reactive dyestuffs are used by the padding process for producing turquoise dyeings or brilliant green dyeings on fibre materials of native or regenerated cellulose fibre substrates or on mixtures of such fibre materials with synthetic fibre materials of polyester or polyamide, the goods acquire an appearance which has a limitation in levelness, which depends greatly on the fibre material and on the illumination conditions, compared with the levelness of a blue, yellow or red dyeing produced in accordance with the prior art and combination dyeings thereof to give the customary fashionable shades. This limitation in levelness which is typical of phthalocyanine reactive dyestuffs is based on the different fixing properties of a phthalocyanine dyestuff on the native and regenerated cellulose fibres.

This becomes particularly clear in the presence of a yellow dyestuff which has different padding and fixing properties.

The disintegration of a turquoise/green mixture during dyeing by the padding process is known both on cotton and on regenerated cellulose fibres. The dyeings obtainable by dyeing with copper phthalocyanine dyestuffs in combination with yellow azo dyestuffs show the problem of fibre unlevelness (tippyness) and tailing (shift in shade due to preferential uptake of turquoise from the padding trough).

During padding, the phthalocyanine dyestuff is preferentially taken up from the carriage. During the cold pad-batch process, the material is subsequently wound up on large rolls, so that the portion padded first is stored inside the wound goods. During the subsequent washing process, however, the outer layer is fed to the continuous washing unit first. The inner portion of the wound goods is therefore stored for longer.

If there are wide differences in the rate of fixing of the turquoise and yellow portion, an additional shift in colour must therefore occur during batching if the turquoise portion is fixed more slowly than the yellow portion, that is to say over the batching times customary for the wound goods in practice, at the end of the fixing process there is often a difference in the fixing bath of yellow and turquoise between the inner and outer layers of a wound-up textile material in the case of the green dyeings known to date. During rinsing of the dyeing, more turquoise is therefore washed out of the outer layers than from the inner layers.

A number of processes have been described for overcoming the slow fixing properties of phthalocyanine reactive dyestuffs, in particular in order to improve the uniformity of dyeing of the individual fibres by the phthalocyanine reactive dyestuffs and the tendency to tail by addition of auxiliaries to the padding bath. However, this method has the disadvantage that the waste water from the dyeing is additionally enriched with fibre swelling agents or dyestuff solvents, the ecological acceptance of which is limited and removal of which from the waste waters is associated with high costs.

The invention is based on the object of providing phthalocyanine reactive dyestuff mixtures for production of turquoise and green dyeings which produce an appearance of goods which is improved compared with the individual dyestuffs, coupled with a good fixing yield, under the dyeing conditions customary in practice and are particularly good for the reactive pad dyeing process.

The dyestuff mixture should have a high solubility and insensitivity to electrolytes, and, under variable temperature, alkali and liquor conditions, should show dyeing properties which, over the course of time, are constant in shade, level over the surface and reproducible.

The present invention relates to a dyestuff mixture of at least two phthalocyanine reactive dyestuffs which contain a different reactive group, characterized in that it comprises at least one phthalocyanine vinylsulphonyl reactive dyestuff 1 and at least one phthalocyanine fluorochloropyrimidinyl reactive dyestuff 2 and/or a phthalocyanine monochlorotriazinyl reactive dyestuff 3, and if appropriate a reactive dyestuff yellow mixture of the dyestuff 4, 5 or 6 and the dyestuff 7, 8 or 9 of the structures shown below.

It has been found, surprisingly, that the levelness of the appearance of the goods from phthalocyanine reactive dyeings on cellulose fibres can be achieved by mixtures of different phthalocyanine reactive dyestuffs instead of by addition of auxiliaries, in particular by mixtures of phthalocyanine reactive dyestuffs which contain different reactive groups.

Preferred dyestuffs 1, 2 and 3 are:

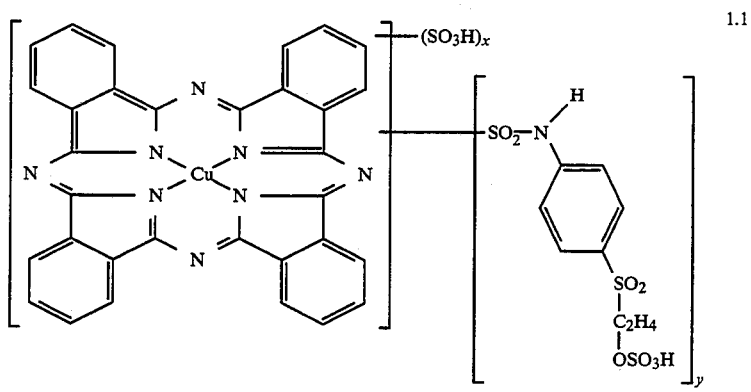

1.1 in which
 $x = 1$ to 3, preferably 1,5–2
 $y = 1$ to 3, preferably 1–2, especially 1,3–1,8
 $y+y$ is between 3 and 4,
e.g. dyestuff 1.2

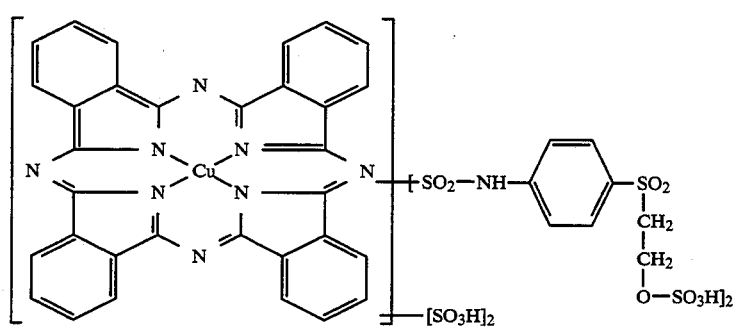

1.2

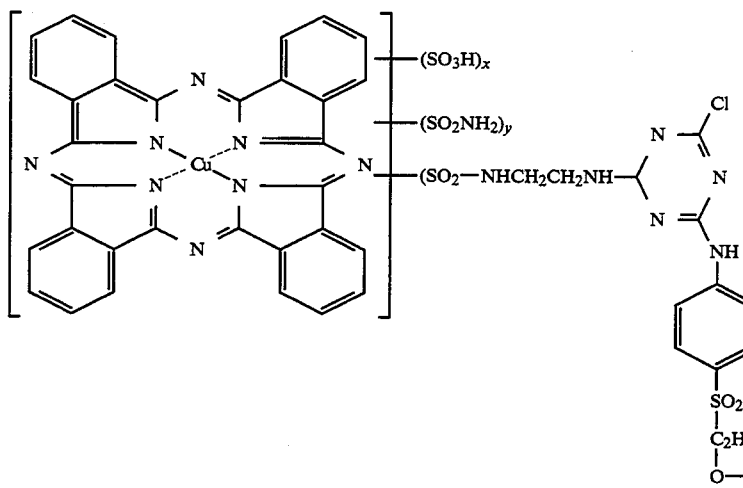

1.3 where $x = 0.8–1.5$
 $y = 0.2–0.5$

-continued
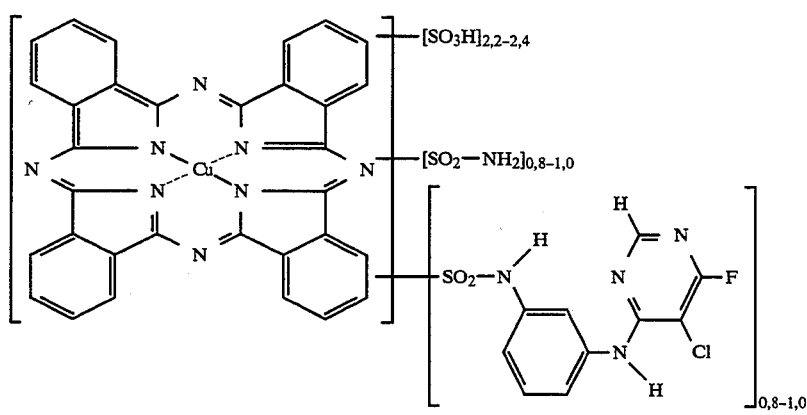
2.1
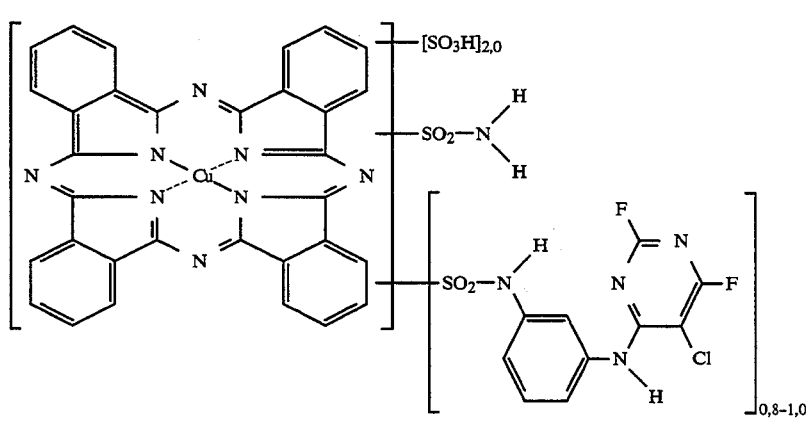
2.2
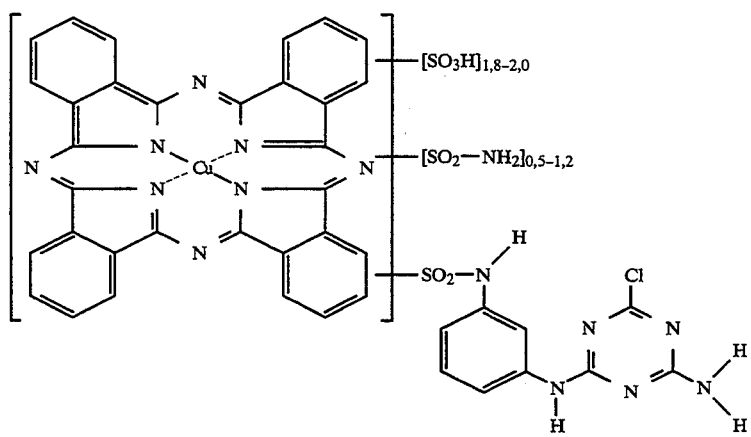
3.1
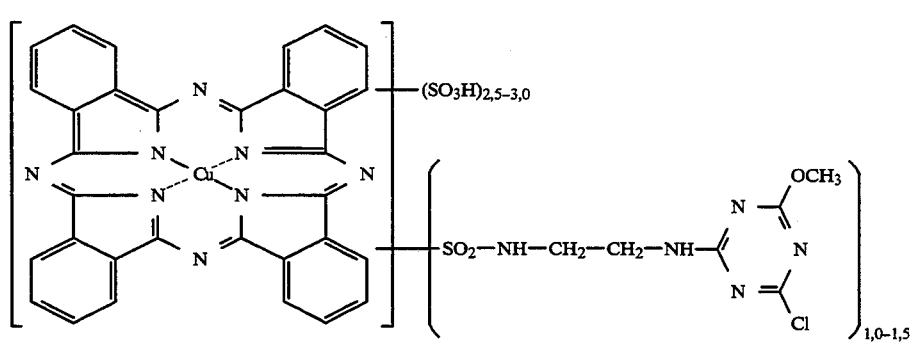
3.2
wherein the number of the substituents denotes a statistical average value.
The dyestuffs 4–9 have the following structure:

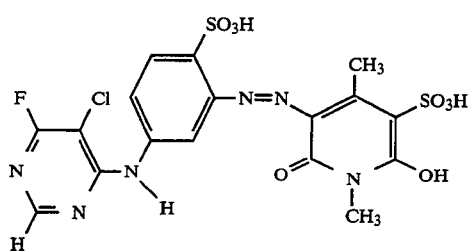
4
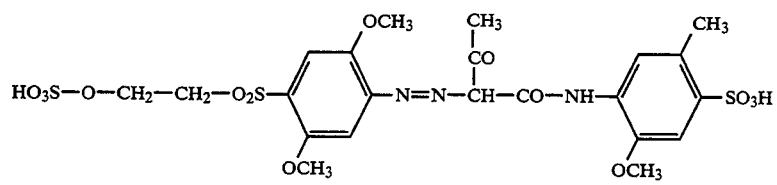
5
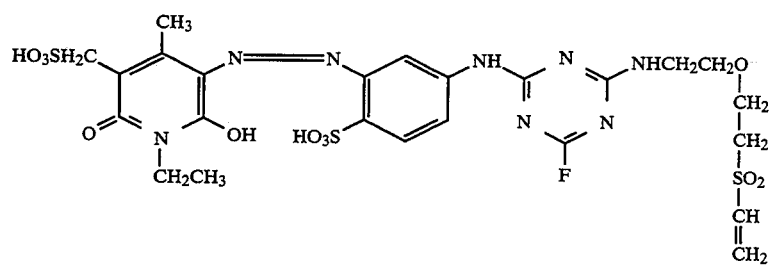
6
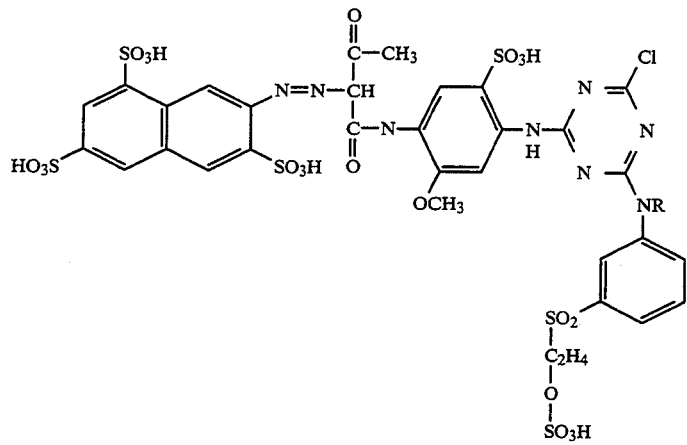
7
R = H, C₂H₅
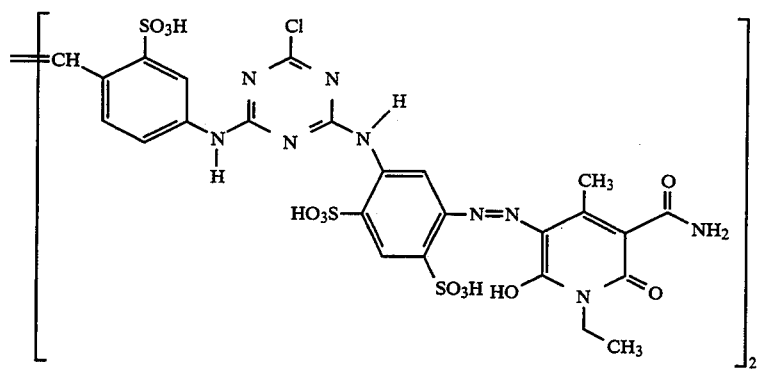
8

-continued

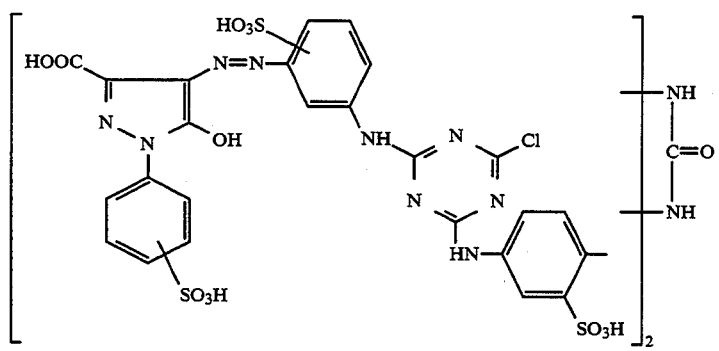

9

Surprisingly, it has furthermore been found that the levelness of the appearance of the goods from phthalocyanine reactive pad dyeings on cellulose fibres can be improved by mixtures of different phthalocyanine reactive dyestuffs, in particular by mixtures of phthalocyanine reactive dyestuffs which contain different reactive groups. It has furthermore been found that the levelness of brilliant green dyeings based on phthalocyanine and brilliant azo yellow reactive dyestuffs can also be improved if mixtures of two reactive yellow dyestuffs which likewise contain different reactive groups are used as the yellow portion.

The process according to the invention is advantageously suitable for the production of brilliant green shades by combined use of a mixture of the dyestuffs 1 and 2 or 1 and 3 with a mixture of the dyestuffs 4, 5 or 6 independently of one another with the dyestuffs 7, 8 or 9.

It has also been found that a considerable improvement in the padding and fixing properties can be achieved during padder application, so that solid shades squeezing off of the padding liquor in the padder and consequent shade fixing in the steamer (pad steam) and in the cold pad batch process are possible.

Particularly preferred reactive turquoise blue mixtures are:
  Mixture 1: Dyestuffs 1.1 with x=about 1,5–2 and y=1,3–1,8 and 2.1
  Mixture 2: Dyestuffs 1.2 and 2.1
  Mixture 3: Dyestuffs 1.3 and 2.1
  Mixture 4: Dyestuffs 1.1 with x=about 1,5–2 and y=1,3–1,8 and 2.2
  Mixture 5: Dyestuffs 1.2 and 3.1
  Mixture 6: Dyestuffs 1.1 with x=about 1,5–2 and y=1,3–1,8 and 3.2.

Particularly preferred reactive yellow mixtures are:
  Mixture 7: Dyestuffs 4 and 7
  Mixture 8: Dyestuffs 4 and 8
  Mixture 9: Dyestuffs 4 and 9
  Mixture 10: Dyestuffs 5 and 7
  Mixture 11: Dyestuffs 5 and 8
  Mixture 12: Dyestuffs 5 and 9
  Mixture 13: Dyestuffs 6 and 7
  Mixture 14: Dyestuffs 6 and 8
  Mixture 15: Dyestuffs 6 and 9

The mixtures comprise, based on the total dyestuff content:

| Dyestuff 1: | 30 to 70, in particular | 40 to 55% by weight |
| Dyestuff 2: | 30 to 70, in particular | 45 to 60% by weight |
| Dyestuff 3: | 0 to 70, in particular | 0 to 45% by weight |
| Dyestuff 4: | 30 to 70, in particular | 50% by weight |
| Dyestuff 5: | 30 to 70, in particular | 50% by weight |
| Dyestuff 6: | 30 to 70, in particular | 50% by weight |

Other dyestuffs or customary auxiliaries can additionally be employed. In particular, the dyestuff mixtures according to the invention comprise up to 50 parts of an inorganic salt, such as, for example, sodium chloride or sodium sulphate, per 100 parts of dyestuff 1). The mixtures according to the invention furthermore preferably comprise a buffer, in particular an inorganic buffer, which produces a buffering range of between pH 6.5 to 7.5. For better handling, the mixtures according to the invention preferably comprise dispersing agents, in particular 0.5 to 10 parts by weight of an organic, anionic dispersing agent, based on the total mixture, and a dust removal agent, preferably 0.5 to 5 parts by weight, based on the total mixture.

The dyestuff mixture can preferably be used for dyeing cotton and other cellulose fibres by the cold batch process. Suitable materials are both pure cellulose fibre materials and mixtures thereof with polyester, such as polyester/cotton, polyester/viscose and polyester/linen, and mixtures of different cellulose fibres, such as cotton/viscose staple or cotton/linen. The main field of use of the mixture is dyeing of cotton woven goods and knitted goods as well as terry goods.

Batching temperatures of 20° C. to 30° C. are possible, the preferred batching temperature is 25° C. and the preferred batching temperature is identical to the preferred padding temperature. The short batching time with respect to the depth of colour for turquoise and green dyeings is to be emphasized as a technical advance.

In another preferred embodiment, the mixture is used in the pad steam process.

The mixtures according to the invention are particularly suitable for dyeing by the padding process, preferably in accordance with the following guideline recipes:
A) Cold batch process

Guideline Recipe 1. 1000 parts of padding liquor comprise

| 1–80 | parts of dyestuff |
| 50–100 | parts of waterglass of specific gravity 1.5 |
| 7.5–15 | parts of sodium hydroxide solution of specific gravity 1.5 |
| 0–100 | parts of urea |
| 0–2 | parts of wetting agent |

-continued

0–20 parts of thickening agent 2. 1000 parts of padding liquor comprise

| 1–80 | parts of dyestuff |
| 8–20 | parts of sodium carbonate |
| 1–12 | parts of sodium hydroxide solution of specific gravity 1.5 |
| 0–100 | parts of urea |
| 0–2 | parts of wetting agent |
| 0–2 | parts of thickening agent |
| Liquor pick-up | 50–120% |
| Padding liquor temperature | 20–30° C. |
| Batching time | 24–48 hours |

B) One-bath pad steam process with intermediate drying

Guideline Recipe 1000 parts of padding liquor comprise
1–80 parts of dyestuff
1–4 parts of wetting agent
5–20 parts of thickening agent
5–20 parts of anhydrous sodium carbonate
0–100 parts of urea
3–5 parts of m-nitrobenzenesulphonate

| Process conditions: | |
|---|---|
| Padding liquor temperature | 20–30° C. |
| Liquor pick-up | 50–70% |
| Drying time | 1–2 minutes |
| Drying temperature | 120–140° C. |
| Steaming temperature | 102–108° C. |
| Steaming time | 1–8 minutes |

C) One-bath pad steam process without intermediate drying

Guideline Recipe 1000 parts of padding liquor comprise
1–80 parts of dyestuff
1–4 parts of wetting agent
10–20 parts of anhydrous sodium carbonate or
10–20 parts of sodium bicarbonate/sodium carbonate 50/50
3–5 parts of m-nitrobenzenesulphonate

| Process conditions: | |
|---|---|
| Padding liquor temperature | 20–30° C. |
| Liquor pick-up | 50–70% |
| Steaming temperature | 102–108° C. |
| Steaming time | 1–8 minutes |

D) Two-bath pad steam process with intermediate drying

Guideline Recipe 1000 parts of padding liquor comprise
1–80 parts of dyestuff
1–4 parts of wetting agent
5–20 parts of thickening agent Chemical Padding Liquor 1000 parts of chemical padding liquor comprise
250 parts of sodium chloride
20–40 parts of anhydrous sodium carbonate and/or
20 parts of sodium hydroxide solution of specific gravity 1.5

| Process conditions: | |
|---|---|
| Padding liquor temperature | 20–30° C. |
| Liquor pick-up | 50–70% |
| Drying time | 1–2 minutes |
| Drying temperature | 120–140° C. |
| Liquor pick-up in the chemical padding | 50–70% |
| Steaming time | 1–8 minutes |
| Steaming temperature | 102–108° C. |

E) Two-bath pad steam process without intermediate drying

Guideline Recipe 1000 parts of padding liquor comprise
1–80 parts of dyestuff
1–40 parts of wetting agent Chemical Padding Liquor 1000 parts of chemical padding liquor comprise
250 parts of sodium chloride
20–40 parts of anhydrous sodium carbonate and/or
20 parts of sodium hydroxide solution of specific gravity 1.5

| Process conditions: | |
|---|---|
| Padding liquor temperature | 20–30° C. |
| Liquor pick-up | 50–70% |
| Liquor pick-up in the chemical padding | 20–50% |
| Steaming time | 1–8 minutes |
| Steaming temperature | 102–108° C. |

F) Pad cure process

Guideline Recipe 1000 parts of padding liquor comprise
1–40 parts of dyestuff
1–4 parts of wetting agent
5–10 parts of sodium carbonate and/or
5–10 parts of sodium bicarbonate
5–20 parts of thickening agent
3–5 parts of m-nitrobenzenesulphonate

| Process conditions: | |
|---|---|
| Padding liquor temperature | 20–30° C. |
| Liquor pick-up | 50–70% |
| Drying time | 1 minute |
| Drying temperature | 120–140° C. |
| Curing temperature | 140–160° C. |
| Curing time | 1 minute |

The mixtures according to the invention furthermore are particularly suitable for dyeing by the exhaust process, preferably in accordance with one of the following plans:

| A) Dyestuff at the start on a winch vat | | |
|---|---|---|
| Time (minutes) | Temperature (°C.) | Measure |
| 0 | 60 | dyestuff addition |
| 15 | 60 | salt addition |
| 45 | 60 | sodium carbonate addition |

| A) Dyestuff at the start on a winch vat | | |
|---|---|---|
| Time (minutes) | Temperature (°C.) | Measure |
| 75 | 60 | start of heating |
| 105 | 80 | dyeing |
| 135 | 80 | end of dyeing |
| 145 | 80 | draining of the dye liquor |
| 165 | 60 | 1st rinsing bath |
| 185 | 60 | 2nd rinsing bath |
| 215 | 80 | 3rd rinsing bath |
| 245 | 80 | 4th rinsing bath |
| 290 | 95 | boiling bath |
| 300 | 20 | cold rinsing, draining |

| B) Salt at the start on jet dyeing apparatus with formulating vessel (The salt is added to the dyebath before the dyestuff) | | |
|---|---|---|
| Time (minutes) | Temperature (°C). | Measure |
| 0 | 30 | salt addition or drawing in of brine bath |
| 15 | 60 | drawing in of dyestuff solution |
| 45 | 60 | drawing in of alkali solution |
| 75 | 60 | start of heating |
| 105 | 80 | dyeing |
| 135 | 80 | end of dyeing |
| 145 | 80 | draining off the dye liquor |
| 165 | 60 | 1st rinsing bath |
| 185 | 60 | 2nd rinsing bath |
| 215 | 80 | 3rd rinsing bath |
| 245 | 80 | 4th rinsing bath |
| 290 | 95 | boiling bath |
| 300 | 20 | cold rinsing, draining |

Other dyestuffs or customary auxiliaries can additionally be employed. In particular, the dyestuff mixtures according to the invention comprise up to 50 parts of an sodium sulphate, per 100 parts of dyestuff 1). The mixtures according to the invention furthermore preferably comprise a buffer, in particular an inorganic buffer, which produces a buffering range of between pH 6.5 to 7.5. For better handling, the mixtures according to the invention preferably comprise dispersing agents, in particular 0.5 to 10 parts by weight of an organic, anionic dispersing agent, based on the total mixture, and a dust removal agent, preferably 0.5 to 5 parts by weight, based on the total mixture.

The dyestuff mixture can preferably be used for dyeing cotton and other cellulose fibres by the exhaust process on customary dyeing units.

Dyeing temperatures of 60° C. to 95° C. are possible, the preferred dyeing temperature is 60° C.

Padding Process

EXAMPLE 1

100 parts of desized and bleached cotton woven goods are impregnated, with a liquor pick-up of 65%, with an aqueous dye liquor which comprises
  2 parts of a commercially available wetting agent
  15 parts of the dyestuff 1.1 with x=about 1,5-2 and y=1,3-1,8
  15 parts of the dyestuff 2.1
  50 parts of waterglass of specific gravity 1.5 and
  7.5 parts of sodium hydroxide solution of specific gravity 15 dissolved in 1000 parts.

The temperature of the liquor is 25° C. The woven fabric web impregnated with dye liquor is wound up, packed in polyethylene film and batched for 24 hours while rotating slowly. Washing out is then carried out on an eight-box continuous open-width washing machine in accordance with the following plan. Cold rinsing twice, warm rinsing twice, extraction at the boil twice, warm rinsing, cold rinsing.

A level, clear turquoise blue dyeing with good fastness properties is obtained.

EXAMPLE 2

1000 parts of desized and bleached cotton woven goods are impregnated, with a liquor pick-up of 65%, with an aqueous dye liquor which comprises
  2 parts of a commercially available wetting agent
  38.5 parts of the dyestuff 1.1 with x=about 1,5-2 and y=1,3-1,8
  38.5 parts of the dyestuff 2.1
  11.5 parts of the dyestuff 4
  11.5 parts of the dyestuff 8
  100 parts of urea
  150 parts of waterglass of specific gravity 1.5 and
  154 parts of sodium hydroxide solution of specific gravity 1.5 dissolved in 1000 parts.

The temperature of the liquor is 25° C. The woven fabric web impregnated with the dye liquor is wound up, packed in polyethylene film and batched for 48 hours while rotating slowly. Washing out is then carried out on an eight-box continuous open-width washing machine in accordance with the following plan: cold rinsing twice, warm rinsing twice, extraction at the boil twice, warm rinsing, cold rinsing.

A deep green dyeing which is level over the surface and uniform at the ends and has good fastness properties is obtained.

EXAMPLE 3

1000 parts of boiled and bleached cotton woven goods are impregnated, with a liquor pick-up of 65%, with an aqueous dye liquor which comprises
  12.5 parts of the dyestuff 1.3
  12.5 parts of the dyestuff 2.2
  7.5 parts of the dyestuff 5
  7.5 parts of the dyestuff 9
  12 parts of anhydrous sodium carbonate and
  8 parts of sodium hydroxide solution of specific gravity 1.356 dissolved in 1000 parts.

The temperature of the padding liquor is 25° C. The woven fabric web impregnated with the dye liquor is wound up, packed in polyethylene film and batched for 48 hours, while rotating slowly. Washing out is then carried out on an eight-box continuous open-width washing machine in accordance with the following plan: cold rinsing twice, warm rinsing twice, extraction at the boil twice, warm rinsing, cold rinsing.

A deep green dyeing which is level over the surface and uniform at the ends and has good fastness properties is obtained.

EXAMPLE 4

1000 parts of desized and bleached cotton woven goods are impregnated, with a liquor pick-up of 75%, with an aqueous dye liquor which comprises
  2 parts of a commercially available wetting agent
  12 parts of the dyestuff 1.2
  12 parts of the dyestuff 2.1
  4 parts of the dyestuff 4

4 parts of the dyestuff 8
10 parts of a commercially available polyacrylate thickening agent and
3 parts of m-nitrobenzenesulphonate dissolved in 1000 parts.

The temperature of the liquor is 30° C. The web of goods subsequently passes through a chemical padding. The aqueous chemical padding bath comprises 250 parts of sodium chloride and 20 parts of sodium hydroxide solution of specific gravity 1.5 in 1000 parts.

After the chemical padding bath, the web of goods is transferred to a high-speed steamer and steamed at 106° C. for 60 seconds. Washing out is then carried out on an eight-box washing machine in accordance with the plan described. Cold rinsing twice, warm rinsing twice, extraction at the boil twice, warm rinsing, cold rinsing. A level green dyeing with good fastness properties is obtained.

EXAMPLE 5

1000 parts of a polyester fibre/cotton fine cord woven fabric comprising 80 parts of cotton and 20 parts of polyester are impregnated, with a liquor pick-up of 75%, with an aqueous dye liquor which comprises
2 parts of a commercially available wetting agent
10 parts of the dyestuff 1.1 with x=about 1,5-2 and y=1,3-1,8
10 parts of the dyestuff 3.2
6 parts of the dyestuff 5
7 parts of the dyestuff 7
10 parts of a commercially available thickening agent and
3 parts of m-nitrobenzenesulphonate dissolved in 1000 parts.

The temperature of the liquor is 30° C. The web of goods is then dried at 120° C. for 1 minute and thermosolled at 220° C. for 1 minute. The web of goods is subsequently impregnated in the chemical padding with a fixing solution which comprises
250 parts of sodium chloride and
30 parts of sodium hydroxide solution of specific gravity 1.5 dissolved in 100 parts.

After the chemical padding, the fabric is steamed in a commercially available steamer at 103° C. for 1 minute. After the subsequent washing and rinsing carried out as described, a clear green dyeing with good fastness properties is obtained.

Exhaust Process

EXAMPLE 6

100 parts of bleached cotton knitted goods and 3 parts of a phthalocyanine reactive dyestuff mixture are added to 1000 parts of an aqueous dye liquor on a winch vat at 60° C. The mixture comprises in each case 1.5 parts of the dyestuff 1.1 with x=about 1,5-2 and y=1,3-1,8 and 1.5 parts of the dyestuff 2.1.

After the dyestuff mixture has become uniformly distributed in the liquor and on the cotton over a period of 15 minutes, 50 parts of sodium chloride are introduced into the dye liquor over a period of 30 minutes and 10 parts of sodium carbonate are then added at intervals of 10 minutes as 3 portions respectively comprising 1 part, 2 parts and 7 parts. The batch is then heated to 80° C. in the course of 30 minutes and the goods are treated at this temperature for 30 minutes. The liquor is then drained off and the goods are rinsed twice at 60° C. and twice at 80° C. They are then extracted at the boil for 15 minutes and the wash liquor is dried off. After cold rinsing, a level turquoise dyeing with good fastness properties is obtained.

The appearance of the goods with the resulting dyeing is more level than the appearance of the goods with a dyeing obtained by the same dyeing plan in which in each case 3 parts exclusively of the dyestuff 1 or of the dyestuff 2 were employed.

EXAMPLE 7

100 parts of cotton knitted goods and 40 parts of sodium chloride are added to 800 parts of an aqueous dye liquor on a commercially available jet dyeing unit at 30° C.

After treatment at this temperature for 10 minutes, the liquor is heated to 60° C. in the course of 15 minutes and 100 parts of a dyestuff solution comprising
1 part of a mixture of
  0.7 part of the dyestuff 1.2
  0.3 part of the dyestuff 2.1 and
2 parts of the dyestuff of the formula 4.1 are added over a period of 45 minutes.

10 parts of anhydrous sodium carbonate dissolved in 100 parts of water are then added over a period of 45 minutes. After 15 minutes, the liquor is heated to 80° C. in the course of 20 minutes and the goods are treated at this temperature for 30 minutes.

The liquor is then drained off and the goods are rinsed twice at 60° C. and twice at 80° C. They are then soaped at the boil for 15 minutes and the wash liquor is drained off. After cold rinsing, a level green dyeing with good fastness properties is obtained.

The appearance of the goods is more level than the appearance of goods with a dyeing obtained by the same dyeing plan in which in each case 1 part of the dyestuff 1 or 1 part of the dyestuff 2 was employed instead of the mixture of dyestuffs 1 and 2.

EXAMPLE 8

100 parts of a bleached cotton yarn are treated on a commercially available yarn-dyeing apparatus, at a liquor circulation of 27 1/kg/minute, with 750 parts of a dye liquor, warmed to 60° C., which comprises
40 parts of sodium sulphate (anhydrous)
10 parts of sodium carbonate (anhydrous)
3 parts of a dyestuff mixture comprising:
  60 parts of the dyestuff 1.3
  40 parts of the dyestuff 2.1 and
2 parts of the dyestuff of the formula 8.

The bath is heated to 80° C. in the course of 20 minutes and kept at this temperature for 60 minutes. After this period of time, the liquor is drained off and the yarn is rinsed twice with 750 parts of a liquor warmed to 60° C. The bath is then filled with 750 parts of fresh liquor which has been warmed to 60° C., 0.5 par of 60% strength acetic acid is added and the bath is warmed to 80° C. After treatment at this temperature for 10 minutes, the liquor is drained off and the bath is filled to the same volume with fresh liquor of 60° C. and brought to 95° C. After treatment at this temperature for 15 minutes, the liquor is drained off and the yarn is rinsed cold with an overflow.

A level deep green dyeing is obtained.

EXAMPLE 9

100 parts of bleached cotton woven goods are treated on a commercially available short liquor jet dyeing unit with 500 parts of a dye liquor, warmed to 60° C., which comprises
  30 parts of sodium chloride
  10 parts of sodium carbonate (anhydrous)
  4 parts of the dyestuff mixture comprising
    50 parts of the dyestuff 1.1 with x=about 1,5–2 and y=1,3–1,8
    50 parts of the dyestuff 2.1
  0.5 part of the dyestuff of the formula 1 part of sodium bicarbonate
10 parts of sodium carbonate (anhydrous)
1.2 parts of a mixture comprising
  70 parts of the dyestuff 1.1 with x=about 1,5–2 and y=1,3–1,8
  30 parts of the dyestuff 3.1
  1.8 parts of the dyestuff of the formula 4
  2.0 parts of the dyestuff of the formula 8.
The bath is kept at this temperature for 60 minutes.

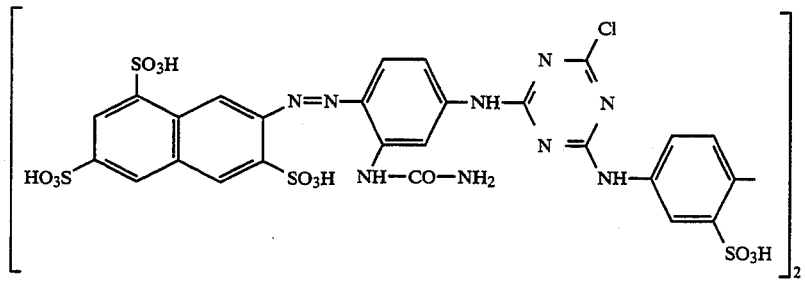

and
0.5 part of the dyestuff of the formula

After this period of time, the liquor is drained off and the fabric is rinsed twice for in each case 10 minutes

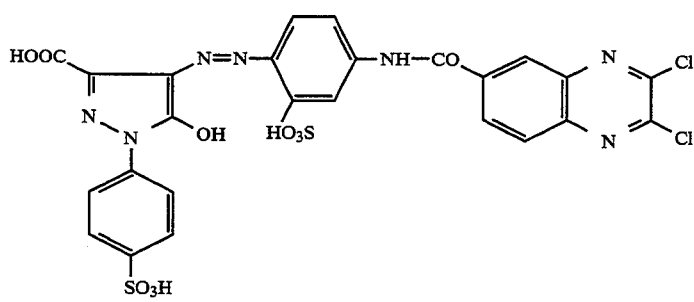

The bath is warmed to 80° C. in the course of 20 minutes and kept at this temperature for 60 minutes. After this period of time, the liquor is drained off and the goods are rinsed twice for in each case 10 minutes with 800 parts of a liquor warmed to 60° C. and twice with 800 parts of a liquor warmed to 80° C.

The goods are then warmed to 95° C. with fresh liquor and extracted at the boil for 20 minutes. After the wash liquor has been drained off, the goods are rinsed cold.

A level green dyeing with good fastness properties is obtained.

EXAMPLE 10

100 parts of a viscose fibre woven fabric are treated at 80° C. on a commercially available jet dyeing unit with 1000 parts of a dye liquor which comprises
  40 parts of sodium sulphate (anhydrous)

with 1000 parts of a liquor warmed to 80° C. It is then warmed to 95° C. with fresh liquor and extracted at the boil for 20 minutes. After the wash liquor has been drained off, the fabric is rinsed cold. A level green dyeing with good fastness properties is obtained.

EXAMPLE 11

100 parts of bleached cotton mesh goods are treated on a commercially available jet dyeing unit with 800 parts of a dye liquor, warmed to 60° C., which comprises
  30 parts of sodium chloride
  10 parts of sodium carbonate (anhydrous)
  4 parts of a dyestuff mixture comprising
    70 parts of the dyestuff 1.1 with x=about 1,5–2 and y=1,3–1,8
    30 parts of the dyestuff 3.2
  0.5 parts of the dyestuff of the formula

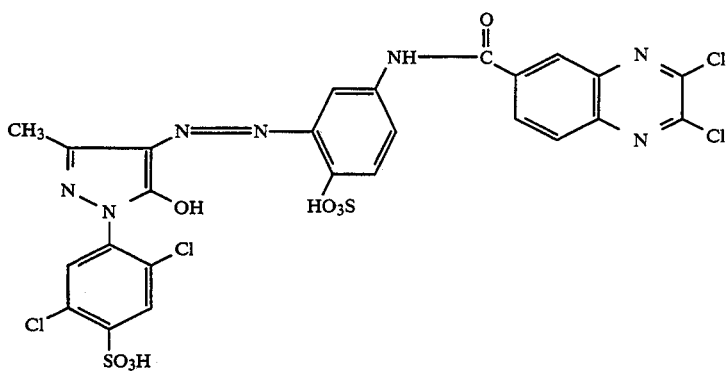

and
0.5 part of the dyestuff of the formula

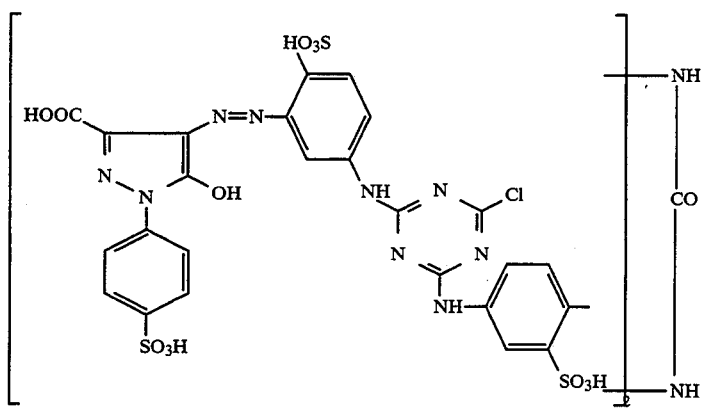

The bath is kept at this temperature for 60 minutes. After this period of time, the liquor is drained off and the goods are rinsed twice for in each case 10 minutes with 1000 parts of a liquor warmed to 60° C. and twice with 1000 parts of a liquor warmed to 80L° C. The goods are then warmed to 95° C. with fresh liquor and extracted at the boil for 20 minutes. After the wash liquor has been drained off, the goods are rinsed cold.

A level green dyeing with good fastness properties is obtained.

EXAMPLE 12

100 parts of bleached cotton mesh goods are treated on a commercially available jet dyeing unit with 800 parts of a dye liquor, warmed to 60° C., which comprises
  40 parts of sodium chloride
  10 parts of sodium carbonate (anhydrous)
  4 parts of a dyestuff mixture comprising
    50 parts of the dyestuff 1.1 with x=about 1,5-2 and y=1,3-1,8
    35 parts of the dyestuff 2.1 and
    15 parts of the dyestuff 2.2
  0.5 part of the dyestuff of the formula

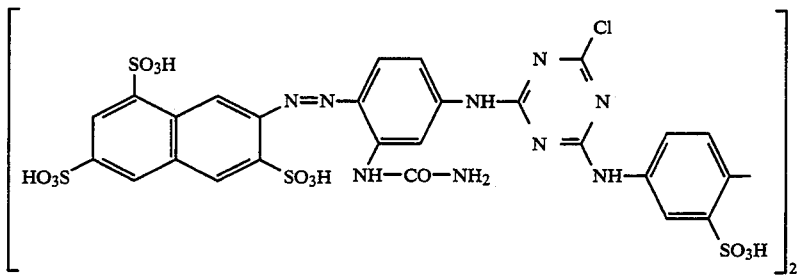

and
0.5 part of the dyestuff of the formula

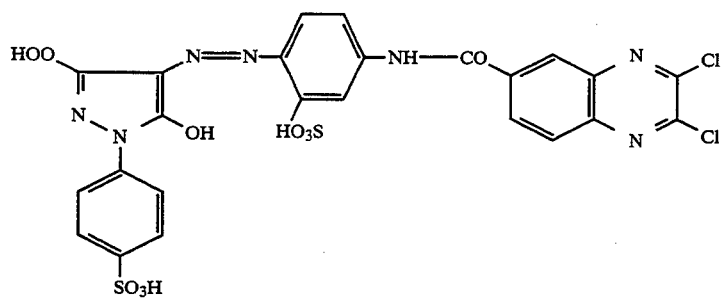

The bath is warmed to 80° C. in the course of 20 minutes and kept at this temperature for 60 minutes. After this period of time, the liquor is drained off and the goods are rinsed twice for in each case 10 minutes with 800 parts of a liquor warmed to 60° C. and twice with 800 parts of a liquor warmed to 80° C.

The goods are then warmed to 95° C. with fresh liquor and extracted at the boil for 20 minutes. After the wash liquor has been drained off, the goods are rinsed cold.

A level green dyeing with good fastness properties is obtained.

What is claimed is:

1. A dyestuff mixture comprising at least two phthalocyanine reactive dyestuffs which contain a different reactive group, characterized in that it comprises at least one phthalocyanine vinylsulphonyl reactive dyestuff 1) and at least one phthalocyanine fluorochloropyrimidinyl reactive dyestuff 2) and/or a phthalocyanine monochlorotriazinyl reactive dyestuff 3).

2. A dyestuff mixture according to claim 1, characterized in that the phthalocyanine vinylsulphonyl reactive dyestuff 1) corresponds to one of the formulae

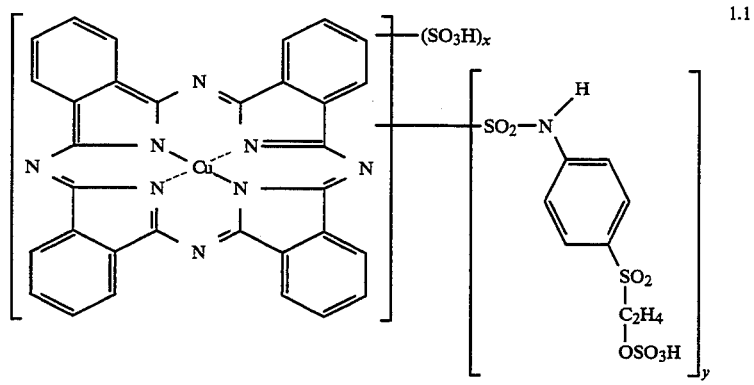

1.1 in which
x = 1 to 3,
y = 1 to 3 and
x + y is between about 3 and 4,

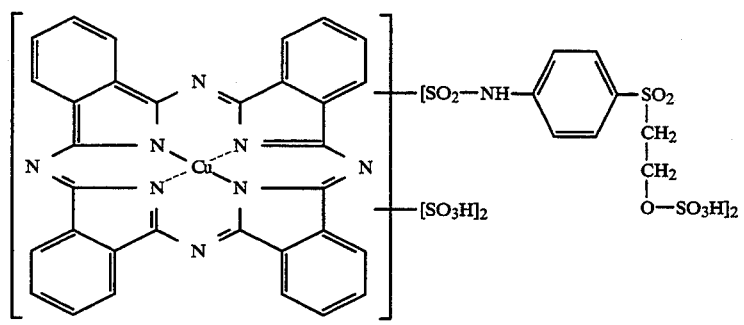

1.2

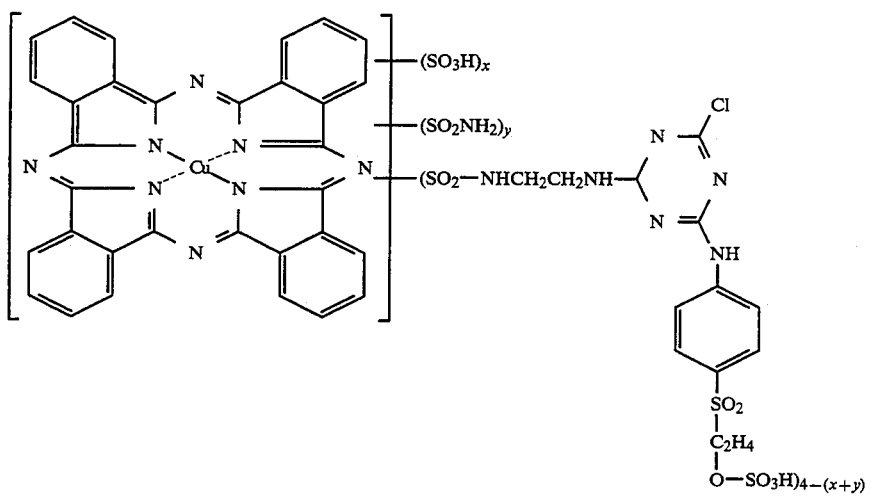
1.3
where x = 0.8–1.5
y = 0.2–0.5
and the phthalocyanine fluorochloropyrimidine reactive dyestuff 2) corresponds to one of the formulae
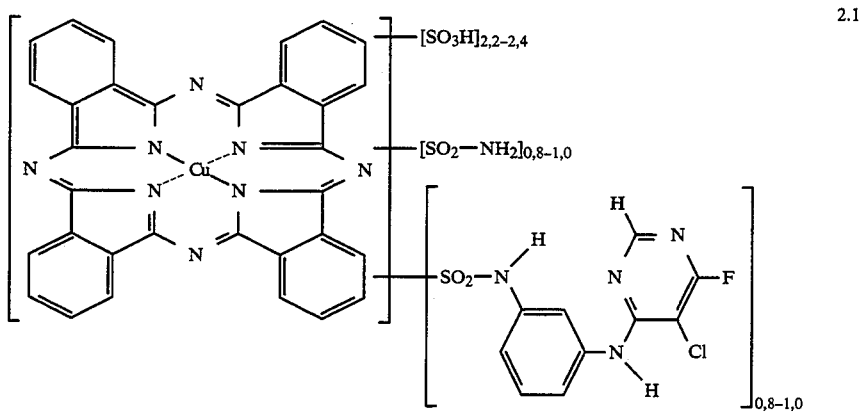
2.1
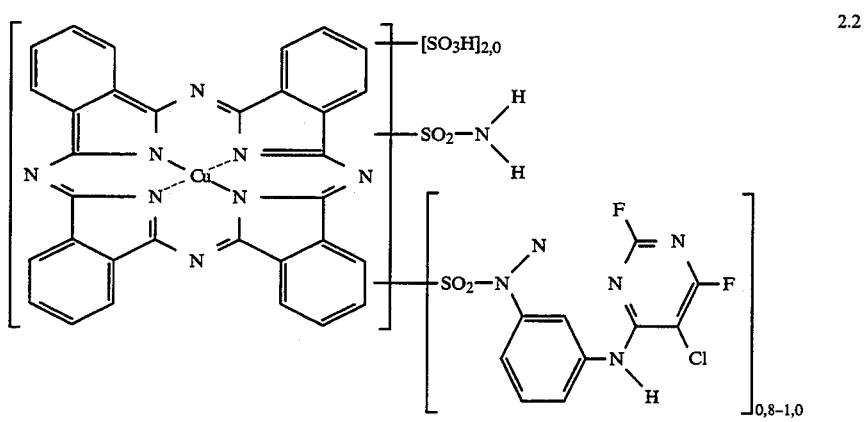
2.2
and the phthalocyanine monochlorotriazinyl reactive dyestuff 3) corresponds to one of the formulae

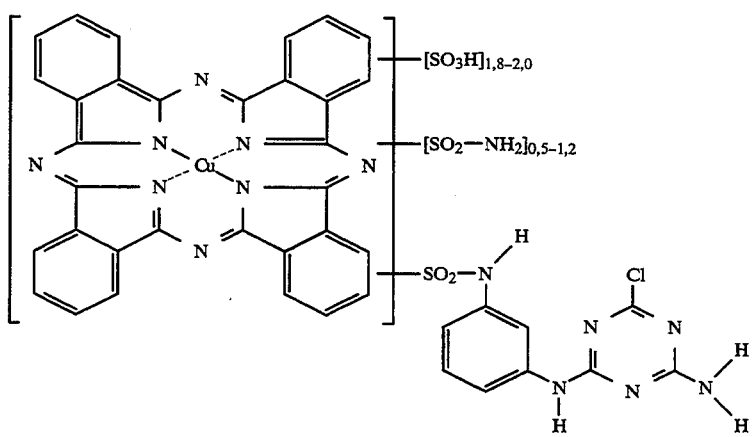

3.1

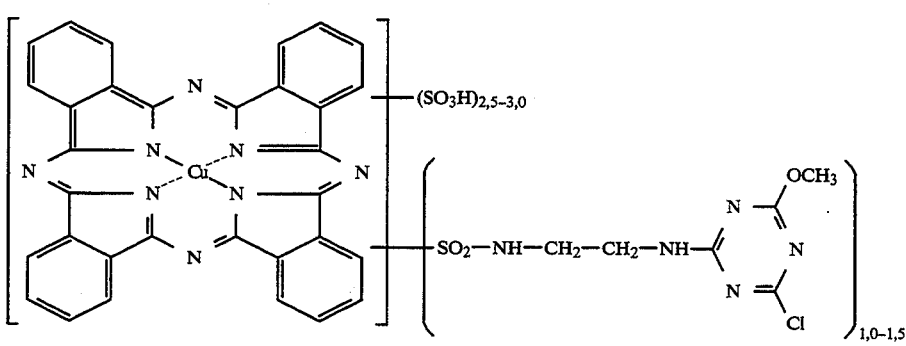

3.2 wherein the number of the substituents denotes a statistical average value.

3. A dyestuff mixture according to claim 1, characterized in that the mixture comprises 30 to 70% by weight of the dyestuff 1), 30 to 70% by weight of the dyestuff 2) and 0 to 70% by weight of the dyestuff 3), based on the total dyestuff content.

4. A dyestuff mixture according to claim 1 characterized in that it comprises up to 50 parts of an inorganic salt per part of dyestuff 1) and a buffer which produces a buffering range of between pH 6.5 and 7.5.

5. A dyestuff mixture according to claim 1, characterized in that the mixture comprises 0.5 to 10 parts by weight of an organic, anionic dispersing agent and 0.5 part by weight of a dust removal agent, in each case based on the total mixture.

6. A process for dyeing cellulose fibres or cellulose mixed fibres with a mixture of reactive dyestuffs, characterized in that a mixture according claim 1 is used.

7. A process according to claim 6, characterized in that dyeing is carried out by the cold pad batch process, the pad steam process or the exhaust process.

8. A dyestuff mixture according to claim 1, characterized in that, in addition to the phthalocyanine vinylsulphonyl reactive dyestuff mixture, it comprises a reactive yellow dyestuff mixture which comprises at least one of the following dyestuffs 4 to 6:

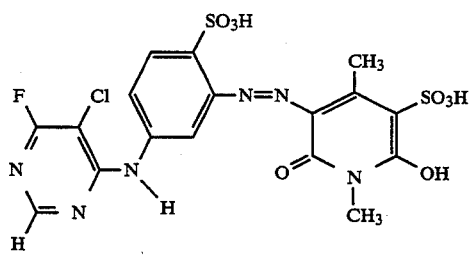

4)

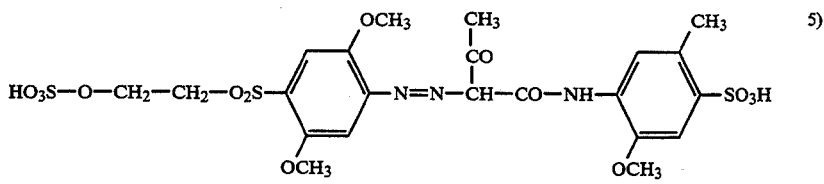

5)

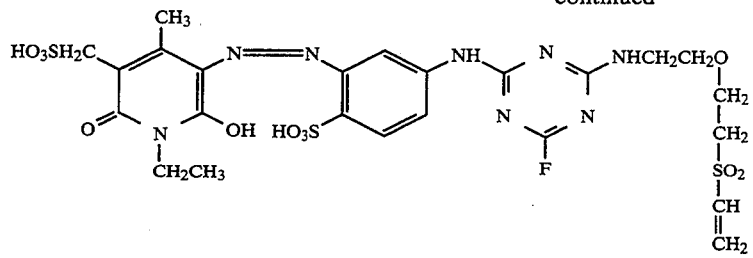
6)
9. A dyestuff mixture according to claim 1, characterized in that, in addition to the phthalocyanine vinylsulphonyl reactive dyestuff mixture, it comprises a reactive yellow dyestuff mixture which comprises at least one of the dyestuffs 7 to 9:
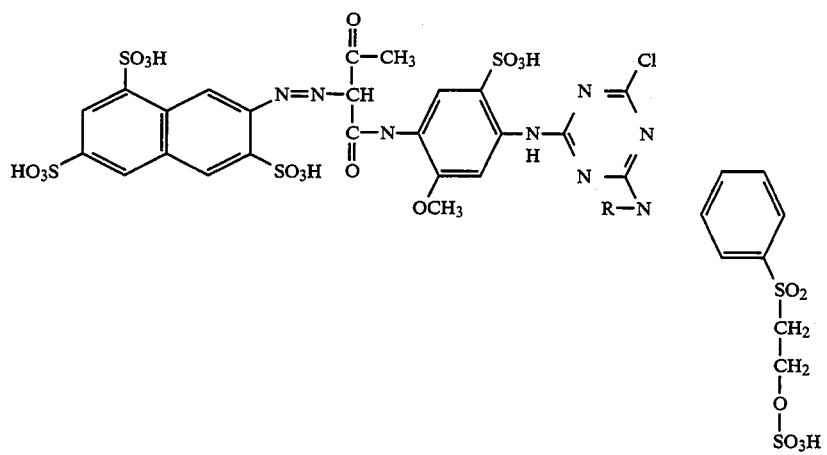
7)
R = H, C₂H₅
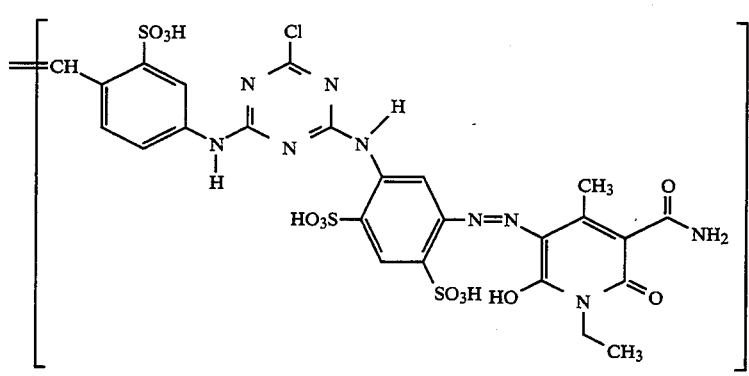
8)
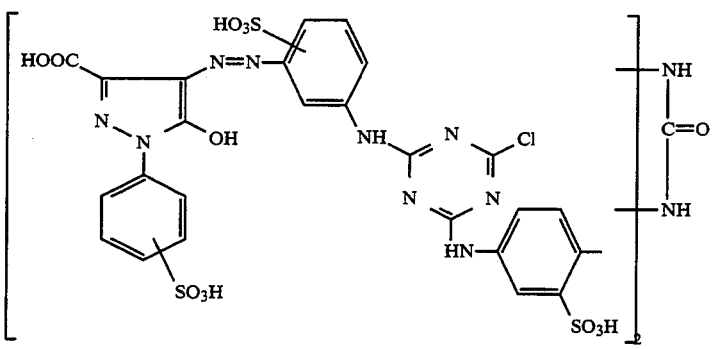
9)
10. Textiles comprising fibres which have been dyed with a reactive dyestuff mixture according to claim 1.

UNITED STATES PATENT AND TRADEMARK OFFICE
CERTIFICATE OF CORRECTION

PATENT NO : 5,356,444
DATED : October 18, 1994
INVENTOR(S): Max Schwarz, et al.

It is certified that error appears in the above-identified patent and that said Letters Patent is hereby corrected as shown below:

Column 23, cancel structural formula "2.2" and insert

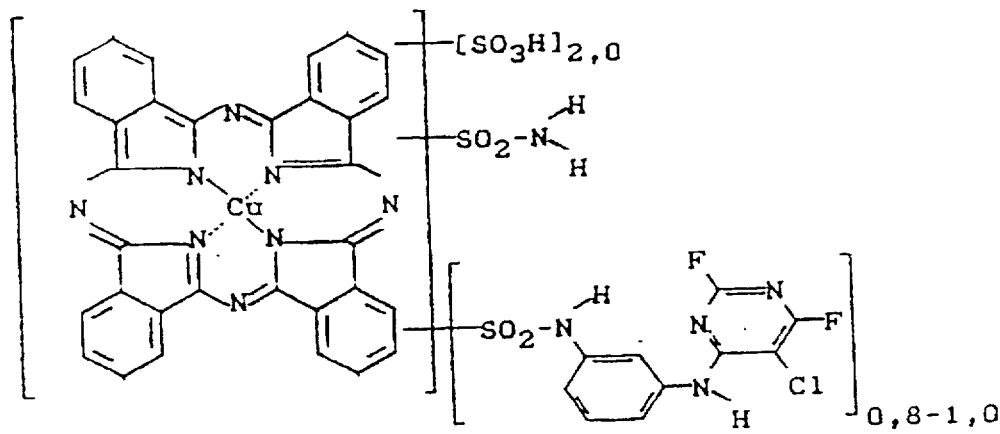

Signed and Sealed this

Twenty-first Day of December, 1999

Attest:

Q. TODD DICKINSON

Attesting Officer   Acting Commissioner of Patents and Trademarks